(12) United States Patent
Dai et al.

(10) Patent No.: US 11,989,956 B2
(45) Date of Patent: May 21, 2024

(54) DYNAMIC HEAD FOR OBJECT DETECTION

(71) Applicant: Microsoft Technology Licensing, LLC, Redmond, WA (US)

(72) Inventors: Xiyang Dai, Seattle, WA (US); Yinpeng Chen, Sammamish, WA (US); Bin Xiao, Bellevue, WA (US); Dongdong Chen, Bellevue, WA (US); Mengchen Liu, Redmond, WA (US); Lu Yuan, Redmond, WA (US); Lei Zhang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 540 days.

(21) Appl. No.: 17/222,879

(22) Filed: Apr. 5, 2021

(65) Prior Publication Data

US 2022/0318541 A1    Oct. 6, 2022

(51) Int. Cl.
*G06V 20/64*  (2022.01)
*G02B 27/01*  (2006.01)
*G06T 3/06*  (2024.01)
*G06T 3/40*  (2006.01)

(52) U.S. Cl.
CPC ......... *G06V 20/64* (2022.01); *G02B 27/0172* (2013.01); *G06T 3/06* (2024.01); *G06T 3/40* (2013.01)

(58) Field of Classification Search
CPC .. G06V 20/64; G02B 27/0172; G06T 3/0031; G06T 3/40
See application file for complete search history.

(56) References Cited

U.S. PATENT DOCUMENTS

2019/0171871 A1* 6/2019 Zhang ............... G06V 40/103
2019/0172224 A1* 6/2019 Vajda ............... G06N 3/045

FOREIGN PATENT DOCUMENTS

CN    111985503 A   * 11/2020

OTHER PUBLICATIONS

Y.-L. Li and S. Wang, "HAR-Net: Joint Learning of Hybrid Attention for Single-Stage Object Detection," in IEEE Transactions on Image Processing, vol. 29, pp. 3092-3103, 2020, doi: 10.1109/TIP.2019.2957850. https://arxiv.org/abs/1904.11141 (Year: 2020).*

(Continued)

*Primary Examiner* — Matthew C Bella
*Assistant Examiner* — Andrew B. Jones
(74) *Attorney, Agent, or Firm* — Foley IP Law, PLLC

(57) ABSTRACT

Systems and methods for object detection generate a feature pyramid corresponding to image data, and rescaling the feature pyramid to a scale corresponding to a median level of the feature pyramid, wherein the rescaled feature pyramid is a four-dimensional (4D) tensor. The 4D tensor is reshaped into a three-dimensional (3D) tensor having individual perspectives including scale features, spatial features, and task features corresponding to different dimensions of the 3D tensor. The 3D tensor is used with a plurality of attention layers to update a plurality of feature maps associated with the image data. Object detection is performed on the image data using the updated plurality of feature maps.

20 Claims, 7 Drawing Sheets

(56) References Cited

OTHER PUBLICATIONS

Qiao, Z., Yuan, X., Zhuang, C., & Meyarian, A. (Jan. 2021). Attention pyramid module for scene recognition. In 2020 25th International Conference on Pattern Recognition (ICPR) (pp. 7521-7528). IEEE. https://ieeexplore.ieee.org/abstract/document/9412235/ (Year: 2021).*

Lin, T. Y., Dollár, P., Girshick, R., He, K., Hariharan, B., & Belongie, S. (2017). Feature pyramid networks for object detection. In Proceedings of the IEEE conference on computer vision and pattern recognition (pp. 2117-2125). https://arxiv.org/pdf/1612.03144v2.pdf (Year: 2017).*

Dai, et al., "Dynamic Head: Unifying Object Detection Heads with Attentions", In Proceedings of IEEE/CVF Conference on Computer Vision and Pattern Recognition, Jun. 20, 2021, pp. 7369-7378.

Ding, et al., "AP-CNN: Weakly Supervised Attention Pyramid Convolutional Neural Network for Fine-Grained Visual Classification", In Journal of IEEE Transactions on Image Processing, vol. 30, Feb. 8, 2021, pp. 2826-2836.

Li, et al., "HAR-Net: Joint Learning of Hybrid Attention for Single-stage Object Detection", In Repository of arXiv:1904.11141v1, Apr. 25, 2019, pp. 1-10.

"International Search Report & Written Opinion issued in PCT Application No. PCT/US22/020662", dated Jun. 10, 2022, 12 Pages.

Cai, et al., "Cascade r-cnn: Delving into high quality object detection", In Proceedings of IEEE Conference on Computer Vision and Pattern Recognition, Jun. 18, 2018, pp. 6154-6162.

Carion, et al., "End-to-end object detection with transformers", In Repository of arXiv:2005.12872v3, May 28, 2020, pp. 1-26.

Chen, et al., "Dynamic ReLU", In Repository of arXiv:2003.10027v2, Aug. 5, 2020, pp. 1-17.

Chen, et al., "Reppoints v2: Verification meets regression for object detection", In Repository of arXiv:2007.08508v1, Jul. 16, 2020, 14 Pages.

Chi, et al., "RelationNet++: Bridging Visual Representations for Object Detection via Transformer Decoder", In Repository of arXiv:2010.15831v1, Oct. 29, 2020, pp. 1-11.

Dai, et al., "Deformable convolutional networks", In Proceedings of the IEEE international conference on computer vision, 2017, pp. 764-773.

Dai, et al., "R-fcn: Object detection via region-based fully convolutional networks", In Repository of arXiv:1605.06409v2, Jun. 21, 2016, pp. 1-11.

Du, et al., "SpineNet: Learning Scale-Permuted Backbone for Recognition and Localization", In Proceedings of IEEE/CVF Conference on Computer Vision and Pattern Recognition (CVPR), Jun. 13, 2020, pp. 11592-11601.

Duan, et al., "Centernet: Keypoint triplets for object detection", In Proceedings of IEEE/CVF International Conference on Computer Vision (ICCV), Oct. 27, 2019, pp. 6569-6578.

Girshick, Ross, "Fast R-CNN", In Proceedings of The IEEE International Conference on Computer Vision, Dec. 7, 2015, pp. 1440-1448.

He, et al., "Deep Residual Learning for Image Recognition", In Proceedings of the IEEE Conference on Computer Vision and Pattern Recognition, Jun. 27, 2016, pp. 770-778.

He, et al., "Mask R-CNN", In Proceedings of the IEEE International Conference on Computer Vision, Mar. 20, 2017, pp. 2961-2969.

Krizhevsky, et al., "Imagenet classification with deep convolutional neural networks", In Journal of Communications of the ACM, vol. 60, Issue 6, Jun. 2017, pp. 84-90.

Lin, et al., "Feature Pyramid Networks for Object Detection", In Proceedings of the IEEE Conference on Computer Vision and Pattern Recognition, Jul. 22, 2017, pp. 2117-2125.

Lin, et al., "Focal loss for dense object detection", In Journal of IEEE Transactions on Pattern Analysis and Machine Intelligence, vol. 42, No. 2, Feb. 2020, pp. 2980-2988.

Lin, et al., "Microsoft COCO: Common Objects in Context", In Journal of The Computing Research Repository, May 1, 2014, 14 Pages.

Liu, et al., "Path aggregation network for instance segmentation", In Proceedings of IEEE Conference on Computer Vision and Pattern Recognition, Jun. 18, 2018, 10 Pages.

Pang, et al., "Libra r-cnn: Towards balanced learning for object detection", In Proceedings of IEEE/CVF Conference on Computer Vision and Pattern Recognition, Jun. 16, 2019, pp. 821-830.

Qiu, et al., "Borderdet: Border feature for dense object detection", In Proceedings of European Conference on Computer Vision, Aug. 23, 2020, pp. 1-17.

Redmon, et al., "You Only Look Once: Unified, Real-Time Object Detection", In Proceedings of IEEE Conference on Computer Vision and Pattern Recognition, Jun. 27, 2016, pp. 779-788.

Ren, et al., "Faster R-CNN: Towards Real-Time Object Detection with Region Proposal Networks", In Journal of IEEE Transactions on Pattern Analysis and Machine Intelligence, Jun. 2015, pp. 1-9.

Singh, et al., "An analysis of scale invariance in object detection—snip", In Proceedings of the IEEE Conference on Computer Vision and Pattern, Jun. 18, 2018, pp. 3578-3587.

Singh, et al., "SNIPER: Efficient Multi-Scale Training", In Proceedings of 32nd Conference on Neural Information Processing Systems, Dec. 3, 2018, pp. 1-11.

Tan, et al., "Efficientdet: Scalable and efficient object detection", In Proceedings of the IEEE/CVF Conference on Computer Vision and Pattern Recognition, Jun. 13, 2020, pp. 10781-10790.

Tian, et al., "Fcos: Fully convolutional one-stage object detection", In Proceedings of IEEE/CVF International Conference on Computer Vision (ICCV), Oct. 27, 2019, pp. 9627-9636.

Vaswani, et al., "Attention Is All You Need", In Repository of arXiv:1706.03762v5, Dec. 6, 2017, 15 Pages.

Wang, et al., "Non-local Neural Networks", Proceedings of the IEEE Conference on Computer Vision and Pattern Recognition, Jun. 18, 2018, pp. 7794-7803.

Wang, et al., "Scale-equalizing pyramid convolution for object detection", In Proceedings of IEEE/CVF Conference on Computer Vision and Pattern Recognition, Jun. 13, 2020, pp. 13359-13368.

Xie, et al., "Aggregated residual transformations for deep neural networks", In Proceedings of IEEE Conference on Computer Vision and Pattern Recognition, Jul. 2017, pp. 1492-1500.

Yang, et al., "Rep-points: Point set representation for object detection", In Proceedings of the IEEE/CVF International Conference on Computer Vision (ICCV), Oct. 2019, pp. 9657-9666.

Yu, et al., "Multi-scale context aggregation by dilated convolutions", In Repository of arXiv:1511.07122v3, Apr. 30, 2016, pp. 1-13.

Zhang, et al., "Bridging the gap between anchor-based and anchorfree detection via adaptive training sample selection", In IEEE/CVF Conference on Computer Vision and Pattern Recognition, Jun. 14, 2020, pp. 9759-9768.

Zhu, et al., "Deformable convnets v2: More deformable, better results", In IEEE/CVF Conference on Computer Vision and Pattern Recognition, Jun. 16, 2019, pp. 9308-9316.

Zhu, et al., "Deformable DETR: Deformable Transformers for End-to-End Object Detection", In Repository of arXiv:2010.04159v2, Nov. 30, 2020, pp. 1-12.

Zitnick, et al., "Edge Boxes: Locating Object Proposals from Edges", In Proceedings of 13th European Conference on Computer Vision, Sep. 2014, pp. 391-405.

Zou, et al., "Object detection in 20 years: A survey", In Repository of arXiv:1905.05055v2, May 16, 2019, pp. 1-39.

* cited by examiner

US 11,989,956 B2

DYNAMIC HEAD FOR OBJECT DETECTION

BACKGROUND

Many tasks in computer vision use a backbone, which is usually pre-trained. The backbone is then used as a feature extractor, which outputs a feature map representation of the input. With this feature map, one or more tasks can be performed, such as detection, segmentation, etc. These tasks are typically performed by applying, for example, a detection head on the feature maps, such that the head is attached to the backbone.

There are a number of challenges in developing an object detection head. First, it is desirable for the head to be scale-aware, since multiple objects with vastly distinct scales often co-exist in an image. Second, it is desirable that the head be spatial-aware, since objects usually appear in vastly different shapes, rotations, and locations under different viewpoints. Third, it is desirable for head to be task-aware, since objects can have various representations (e.g., bounding box, center, and corner points) that have totally different objectives and constraints. Conventional systems are configured to address one of these challenges or addressing the challenges using separate systems. For example, designing a unified head can be regarded as an attention learning problem. But, because conventional approaches use a full self-attention mechanism over this tensor, the optimization problem is extremely difficult to solve, resulting in extremely high computational cost that is often not practically feasible to implement.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for object detection comprises generating a feature pyramid corresponding to image data, and rescaling the feature pyramid to a scale corresponding to a median level of the feature pyramid, wherein the rescaled feature pyramid is a four-dimensional (4D) tensor. The computerized method further comprises reshaping the 4D tensor into a three-dimensional (3D) tensor having individual perspectives including scale features, spatial features, and task features corresponding to different dimensions of the 3D tensor. The computerized method also comprises using the 3D tensor and a plurality of attention layers to update a plurality of feature maps associated with the image data, and performing object detection on the image data using the updated plurality of feature maps.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described herein are configured to provide a unified head that is configured to be scale-aware, spatial-aware, and task-aware. In one or more examples, the unified head is a dynamic head configured to unify scale-awareness, spatial-awareness, and task-awareness simultaneously. Instead of building a full self-attention mechanism, the present disclosure deploys attention mechanisms on a particular dimension of features, such as level-wise, spatial-wise, and channel-wise. In one example, a feature pyramid corresponding to image data is generated and then rescaled to a scale corresponding to a median level of the feature pyramid, which results in the rescaled feature pyramid being a four-dimensional (4D) tensor. The 4D tensor is reshaped into a three-dimensional (3D) tensor corresponding to scale features, spatial features, and task features corresponding to a general view comprising a plurality of feature maps.

In various examples, with the 3D tensor that has been rescaled and reshaped, object detection is performed using the plurality of feature maps (which are updated and/or reformed as described herein). That is, the scale-aware attention processor is only deployed on the dimension of level and is configured to learn the relative importance of various semantic levels to enhance the feature at a proper level for an individual object based on scale. The spatial-aware attention processor is deployed on the dimension of space and learns coherently discriminative representations in spatial locations. The task-aware attention processor is deployed within channels and directs different feature channels to favor different tasks separately (e.g., classification, box regression, and center/key-point learning) based on different convolutional kernel responses from objects. As such, the resulting system with the dynamic head performs operations on the rescaled and reshaped tensor that have a reduced computational cost compared to conventional approaches. In this manner, when a processor is programmed to perform the operations described herein, the processor is used in an unconventional way that allows for more efficient and reliable object detection, which results in an improved user experience.

In various examples, a dynamic head framework is configured to unify object detection heads with attentions. By coherently combining multiple self-attention mechanisms between feature levels (of a rescaled and reshaped tensor) for scale-awareness, among spatial locations for spatial-awareness, and within output channels for task-awareness, the present disclosure improves the representation ability of object detection heads without added computational overhead.

Figure 1:
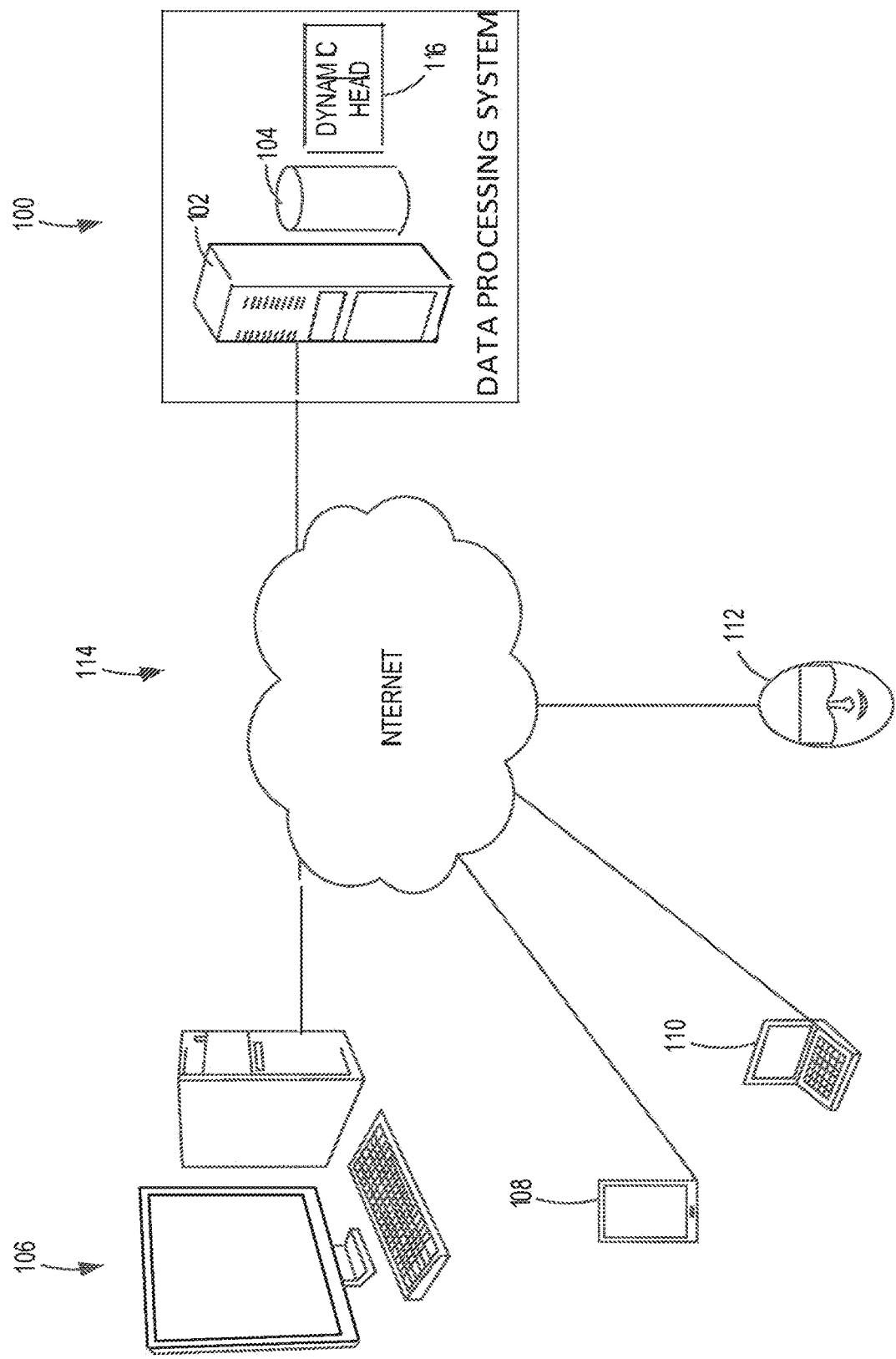
FIG. 1 is a block diagram illustrating a system according to an example.

The processes described herein are not limited to object detection, but can be implemented with different types of computer tasks in different applications. The object detection processes, such as performing localization and classification in object detection, can be implemented in a data processing system 100 (e.g., an object detection system) deployed as a cloud service as illustrated in FIG. 1. In this example, the data processing system 100 implements the object detection processes described herein to allow for efficient object detection using different attention mechanisms. That is, the data processing system 100 operates using a unified head framework that in some examples relies on different attention mechanisms on each of a particular dimension of features, such as level-wise, spatial-wise, and channel-wise.

The data processing system 100 includes one or more computers 102 and storage 104 to store, for example, image. It should be appreciated that other data can be stored in the storage 104 and processed by the one or more computers 102 using the present disclosure.

The data processing system 100 is connected to one or more end user computing devices in some examples, such as a desktop computer 106, a smart phone 108, a laptop computer 110, and an augmented reality head worn computer 112 (e.g., Microsoft HoloLens®). For example, the data processing system 100 is shown as connected to the end user computing devices via a computer network 114, illustrated as the Internet.

The data processing system 100 receives input data, such as image data from an end user computing device or server. The data is uploaded to the data processing system 100 for processing, such as for object detection processing that identifies one or more objects within the images. It should be appreciated that some or all of the data processing system 100 or the functionality of the data processing system 100 can be implemented within the end user computing device.

The data processing system 100 in this example implements a dynamic head 116 that performs object detection using separate attention mechanism on different layers of feature information in a feature pyramid (e.g., feature map representations of the input images), which allows for efficient and effective object detection. With the dynamic head 116, in some examples, feature maps are improved after processing by each of a plurality of attention processors as discussed in more detail herein. In some examples, the functionality of the data processing system 100 described herein is performed, at least in part, by one or more hardware logic components. For example, and without limitation, illustrative types of hardware logic components that are used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Thus, with the present disclosure, improved object detection using less computations resources is performed. As such, computational accuracy can be maintained while having the reduced "cost" (e.g., computational and/or storage requirements) of the operations being performed on a less complex optimization problem. For example, with the dynamic head 116 of the present disclosure, improved object detection is performed where otherwise not computationally feasible.

Figure 2:
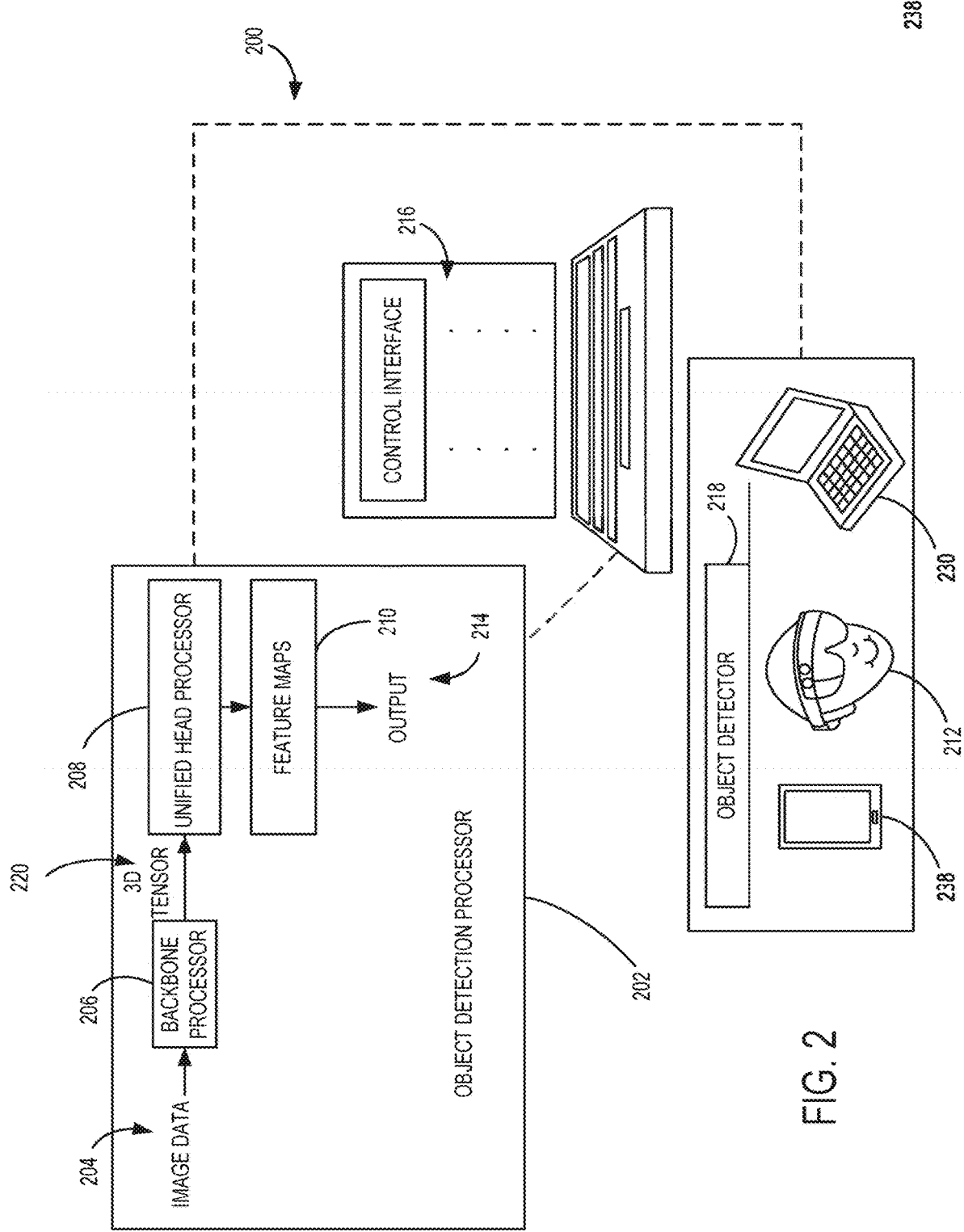
FIG. 2 is a block diagram illustrating an object detection system according to an example.

Various examples include an object detection system 200 as illustrated in FIG. 2. The object detection system 200 in one example uses a unified head with different attention mechanisms to process a 3D tensor (having being rescaled and reshaped as described herein) to generate an output 214, which in one example is an image having objects detected. More particularly, the object detection system 200 includes an object detection processor 202 that is configured in some examples as a processing engine that performs object detection on image data 204, which includes one or more images. It should be noted that the image data 204 can include different types of image data configured in different ways. It should also be noted that the present disclosure can be applied to different types of data, including non-image data. In some examples, by providing a rescaled and reshaped tensor (3D tensor), efficient processing of the plurality of feature maps is performed in various examples.

The object detection processor 202 has access to the input data, such as the image data. For example, the object detection processor 202 accesses image data acquired by a camera or other image acquisition device as the input data 204 for use in performing object detection. It should be appreciated that the object detection processor 202 is configured to perform object detection tasks in a wide variety of application domains. For example, the present disclosure provides object detection for different types of datasets, in addition to the image datasets described herein.

In the illustrated example, the input data includes image data, wherein the object detection processor 202 first processes the input data with a backbone processor 206 that is configured in some examples to generate an improved 3D tensor 220. That is, the 3D tensor 220 in various examples is more efficiently processed with less computational resources. As described in more detail herein, a feature pyramid corresponding to the input data is generated and then rescaled to a scale corresponding to a median level of the feature pyramid, which results in the rescaled feature pyramid being a 4D tensor. The 4D tensor is reshaped into the 3D tensor 220 corresponding to scale features, spatial features, and task features corresponding to a general view comprising a plurality of feature maps, which is then output to a unified head processor 208 that generates incrementally improved feature maps 210 (e.g., feature maps that allow for more reliable or accurate object detection).

In one example, the unified head processor 208 first performs scale-aware attention processing to dynamically fuse scale features from different scales and then performs spatial-aware attention processing on a dimension of space of the 3D tensor 220 (e.g., separate attention processing on each spatial dimension). In one example, the spatial aware processing is configured to aggregate spatial features across levels at the same spatial locations. The unified head processor then performs task-aware processing within channels of the 3D tensor 220 after performing the scale-aware processing and the spatial-aware processing. In one example, the task-aware processing is configured to generalize different representations of objects, wherein the plurality of feature maps are reformed into different activations based on different object detection tasks to be performed. It should be appreciated that the order of processing is merely an example of the processing steps performed. That is, the processing can be performed in a different order, partial processing performed, processing steps repeated, etc.

With the feature maps 210 generated, the object detection processor 202 performs object detection on the image data 204 using the updated and/or reformed plurality of feature maps to generate the output 214. That is, one or more objects in the image data 204 is reliably and accurately determined using the object detection processor 202.

Figure 3:
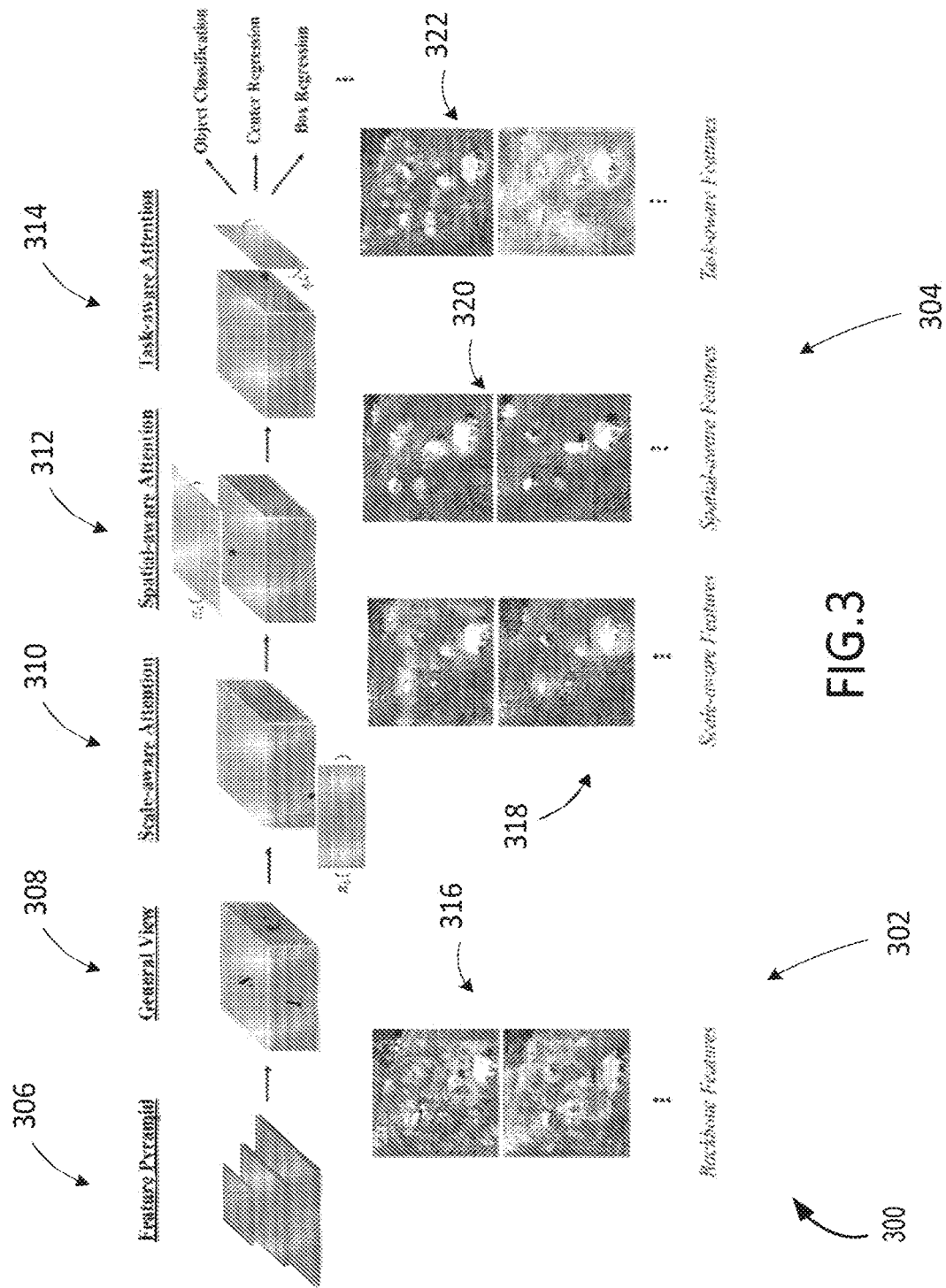
FIG. 3 is a block diagram of a dynamic head architecture according to an example.

One example of a dynamic head architecture 300 implemented by the object detection processor 202 is shown in FIG. 3. The dynamic head architecture 300 is configured to perform one or more tasks on a plurality of images as described herein. The dynamic head architecture 300 in this example implements a dynamic head framework to unify object detection heads with attentions when processing the rescaled and reshaped 3D tensor 220. By coherently combining multiple self-attention mechanisms between feature levels for scale-awareness, among spatial locations for spatial-awareness, and within output channels for task-awareness, which can be performed as a result of generating the rescaled and reshaped 3D tensor 220, the present disclosure improves the representation ability of object detection heads without added computational overhead.

The dynamic head architecture 300 in various examples is configured to perform object detection, for example, in computer vision applications. For example, the dynamic head architecture 300 is configured as an object detector to perform deep learning using a backbone 302 for feature extraction and a unified head 304 for localization and classification tasks. As discussed herein, the unified head 304 is scale-aware, spatial-aware, and task-aware. That is, the unified head 304 is a dynamic head in some examples, configured to unify scale-awareness, spatial-awareness, and task-awareness together. In the illustrated example, the output of the backbone 302 (e.g., the input to the unified head 304 acting as a detection head) is the 3D tensor 220 with dimensions of level×space×channel and is processed by the unified head 304 using attention mechanisms on a particular dimension of features (e.g., level-wise, spatial-wise, and channel-wise) instead of as a full self-attention mechanism, which is made possible by the 3D tensor 220.

In the illustrated example, processing is separately performed using scale-aware attention 310, spatial-aware attention 312, and task-aware attention 314. For example, the scale-aware attention 310 is only deployed on the dimension of level and learns the relative importance of various semantic levels to enhance the feature at a proper level for an individual object based on the scale thereof. The spatial-aware attention 312 is deployed on the dimension of space (i.e., height×width) and learns coherently discriminative representations in spatial locations. The task-aware attention 314 is deployed within channels and directs different feature channels to favor different tasks separately (e.g., classification, box regression, and center/key-point learning) based on different convolutional kernel responses from objects.

As such, a unified attention mechanism for the detection head is implemented. It should be noted that although the attention mechanisms are separately applied on different dimensions of a feature tensor, namely the 3D tensor 220, the performance of each can complement one another to allow for learning a better representation that can be utilized to improve all kinds of object detection models, and uses less training time, yet with improved performance. For example, the scale-aware attention 310 in the unified head 304 is configured to make the importance of various features level adaptive to the input. The spatial-aware attention 312 in the unified head 304 is configured to not only apply attention to each spatial location, but also adaptively aggregate multiple feature levels together for a more discriminative representation learning. The task-aware attention 314 in the unified head 304 is configured to allow attention to be deployed on channels, which can adaptively favor various tasks, such as for single or two-stage detectors, or box/center/keypoint based detectors.

More particularly, given a concatenation of features $\mathcal{F}_{in} = \{F_i\}_{i=1}^{L}$ from L different levels in a feature pyramid 306, the dynamic head architecture 300 resizes consecutive level features towards the scale of the median level feature using up-sampling or down-sampling, denoted as $\mathcal{F}$. Thus, the rescaled feature pyramid 306 is a 4D tensor $\mathcal{F} \in \mathfrak{R}^{L \times H \times W \times C}$, where L represents the number of levels in the pyramid, H, W, and C represents height, width, and channel numbers of the median level feature, respectively. And, further defining S=H×W, the tensor is reshaped into a 3D tensor $\mathcal{F} \in R^{L \times S \times C}$. Based on this representation, each tensor dimension has a different role, including the following:

The discrepancy of object scales is related to features at various levels. By improving the representation with the present disclosure, learning across different levels of $\mathcal{F}$ can benefit scale-awareness of object detection according to various examples;

Various geometric transformations from dissimilar object shapes are related to features at various spatial locations. By improving the representation with the present disclosure, learning across different spatial locations of $\mathcal{F}$ can benefit spatial-awareness of object detection; and Divergent object representations and tasks can be related to the features at various channels. By improving the representation with the present disclosure, learning across different channels of $\mathcal{F}$ can benefit task-awareness of object detection.

The present disclosure unifies these roles in an efficient attention learning problem, which in various examples includes combining multiple attentions on all three dimensions to formulate the unified head 304 for maximizing improvements.

In one particular example, given the feature tensor $\mathcal{F} \in R^{L \times S \times C}$, the general formulation of applying self-attention is defined as: $W(\mathcal{F}) = \pi(\mathcal{F}) \cdot \mathcal{F}$, where $\pi(\cdot)$ is an attention function. A naïve solution to this attention function is implemented by fully connected layers. But, directly learning the attention function over all dimensions is computationally costly and practically not affordable due to the high dimensions of the tensor. In various examples, instead, the attention function is converted into three sequential attentions, each focusing on only one perspective as follows:

$W(\mathcal{F}) = \pi_C(\pi_S(\pi_L(\mathcal{F}) \cdot \mathcal{F}) \cdot \mathcal{F}) \cdot \mathcal{F}$, where $\pi L(\cdot)$, $\pi S(\cdot)$, and $\pi C(\cdot)$ are three different attention functions applying on dimension L, S, and C, respectively.

The three attention mechanisms, namely the scale-aware attention 310, the spatial-aware attention 312, and the task-aware attention 314 will now be described. In this example, the scale-aware attention 310 is $\pi_L$ and is configured to dynamically fuse features from different scales based on the semantic importance as follows:

$$\pi_L = (\mathcal{F}) \cdot \mathcal{F} = \sigma\left(f\left(\frac{1}{SC}\sum_{S,C}\mathcal{F}\right)\right) \cdot \mathcal{F},$$

where $f(\cdot)$ is a linear function approximated by a 1×1 convolutional layer, and $\sigma(x) = \max(0, \min(1, x+\frac{1}{2}))$ is a hard sigmoid function.

Continuing with this example, the spatial-aware attention 312 is $\pi_S$ and based on the fused feature to focus on discriminative regions consistently co-existing among both spatial locations and feature levels. Considering the high dimensionality in S, the spatial-aware attention 312 is decomposed into two steps: first making the attention learning sparse by deformable convolution and then aggregating features across levels at the same spatial locations as follows:

$$\pi_S(\mathcal{F}) \cdot \mathcal{F} = \frac{1}{L}\sum_{l=1}^{L}\sum_{k=1}^{K} w_{l,k} \cdot \mathcal{F}(l; p_k + \Delta p_k; c) \cdot \Delta m_k,$$

where K is the number of sparse sampling locations, $p_K+\Delta p_K$ is a shifted location by the self-learned spatial offset $\Delta p_k$ to focus on a discriminative region and $\Delta m_k$ is a self-learned importance scalar at location $p_k$. Both of these are learned from the input feature from the median level of $\mathcal{F}$.

Continuing with this example, the task-aware attention 314 is $\pi_C$ and is configured to enable joint learning and generalizing of different representations of objects. In this example, the task-aware attention 314 is employed as the last step or at the end of the processing pipeline. The task-aware attention 314 in some examples dynamically switches ON and OFF channels of features to favor different tasks as follows:

$$\pi_C(\mathcal{F}) \cdot \mathcal{F} = \max(\alpha^1(\mathcal{F}) \cdot \mathcal{F}_c + \beta^1(\mathcal{F}), \alpha^2(\mathcal{F}) \cdot \mathcal{F}_c + \beta^2(\mathcal{F})),$$

where $\mathcal{F}_c$ is the feature slice at the c-th channel and $[\alpha^1, \alpha^2, \beta^1, \beta^2]^T = \theta(\cdot)$ is a hyper function that learns to control the activation thresholds. $\theta(\cdot)$ is configured in one example to first conduct a global average pooling on L×S dimensions to reduce the dimensionality, followed with a neural network having two fully connected layers and a normalization layer. Then a shifted sigmoid function is used to normalize the output to [−1, 1].

Figure 4:
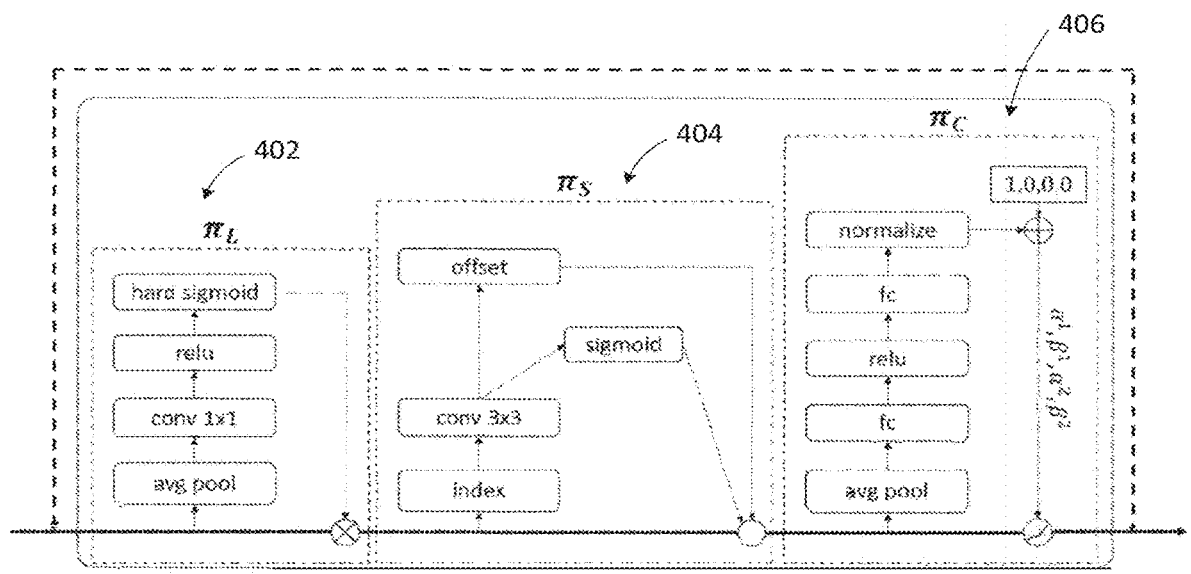
FIG. 4 is a block diagram of a head block according to an example.

It should be that since the above three attention mechanisms (i.e., the scale-aware attention 310, the spatial-aware attention 312, and the task-aware attention 314) are applied sequentially, the equation for W($\mathcal{F}$) can be nested multiple times to effectively stack multiple $\pi_L$, $\pi_S$, and $\pi_C$ blocks 402, 404, 406 together as illustrated by the head block 400 shown in FIG. 4. That is, the head block 400 illustrates an implementation of the unified head 304 having the scale-aware attention 310, the spatial-aware attention 312, and the task-aware attention 314 represented by $\pi_L$, $\pi_S$, and $\pi_C$ and defined by the equation described above.

Thus, object detection can be performed using the dynamic head architecture 300. It should be appreciated that any kind of backbone network can be used to extract the feature pyramid 306, which is further resized to the same scale, forming the 3D tensor 220 (illustrated as the general view 308 with dimensions L×S×C), which is then used as the input to the dynamic head.

It should be noted that variations and modifications are contemplated, such as by sequentially stacking multiple head blocks 400 including scale-aware, spatial-aware, and task-aware attentions. It should also be appreciated that the output of the dynamic head can be used for different tasks and representations of object detection, such as classification, center/box regression, etc.

With reference again to FIGS. 2 and 3, the feature maps include backbone features 316, scale-aware features 318, spatial-aware features 320, task-aware features 322 represent the outputs from the initial backbone processing through the processing with the scale-aware attention 310, the spatial-aware attention 312, and the task-aware attention 314. It should be appreciated that the backbone features 316 output from the processing by the backbone 302 are noisy due to the domain being different from the pre-training. However, after being processed using the scale-aware attention 310, the scale-aware features 318 become more sensitive to the scale differences of foreground objects. Then, after processing by the spatial-aware attention 312, the spatial-aware features 320 become more sparse and focused on the discriminate spatial locations of foreground objects. Finally, after processing by the task-aware attention 314, the task-aware features 322 reform into different activations based on the requirements of different downstream tasks. Thus, incremental improvements results from the various processing stages or steps.

Also, with respect to the object detection processor 202, various parameters, etc. can be specified by an operator. For example, an operator is able to specify weighting values of different layers of the neural network topology, the sensitivity of different attentions, etc. using a control interface 216. For example, once the operator has configured one or more parameters, the object detection processor 202 is configured to perform object detection as described herein. It should be noted that in some examples, once the training of one or more neural networks is complete (for example, after the training data is exhausted) a trained object detector 218 is stored and loaded to one or more end user devices such as the smart phone 238, the wearable augmented reality computing device 212, the laptop computer 230 or other end user computing device. The end user computing device is able to use the trained object detector 218 to carry out one or more tasks, such as for object detection.

Figure 5:
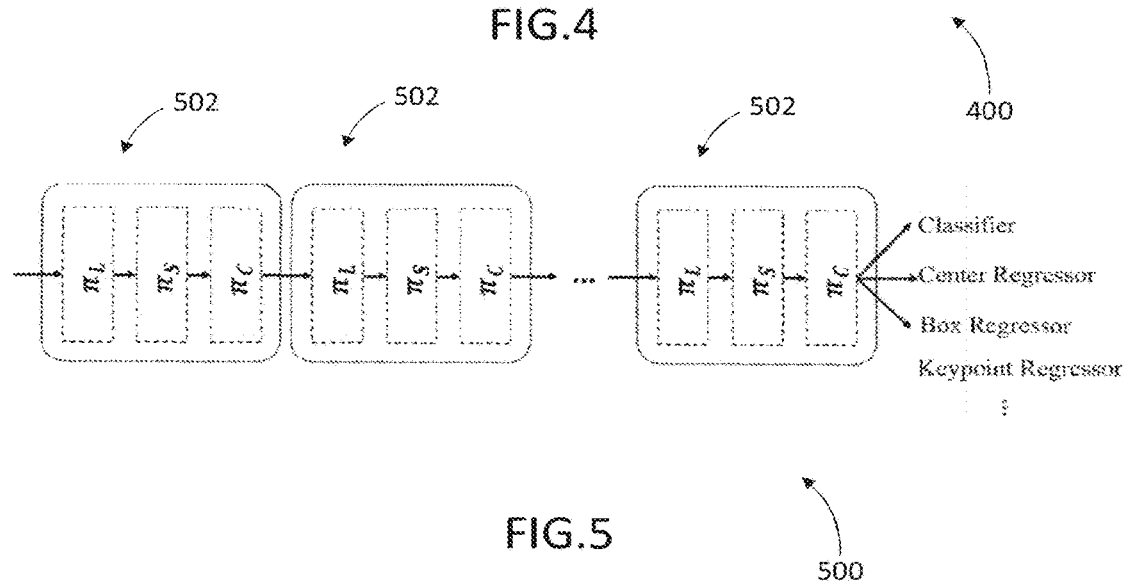
FIG. 5 is a block diagram illustrating a one-stage detector according to an example.

The dynamic head architecture 300 can be integrated into different object detectors to improve the performance of the detectors. For example, a one-stage detector 500 is illustrated in FIG. 5 and is configured to predict object locations by densely sampling locations from one or more feature maps, which simplifies the detector design. Instead of having a backbone network to extract dense features and multiple task-specific sub-network branches to handle different task separately, the one one-stage detector 500 is configured having a unified branch instead of multiple branches to the backbone. As such, the one-stage detector 500 is operable to perform multiple tasks simultaneously by advantageously using the multiple attention mechanisms (i.e., the scale-aware attention 310, the spatial-aware attention 312, and the task-aware attention 314) in each of a plurality of heads 502 that are sequentially aligned. In this way, the architecture can be further simplified and the efficiency improved as well. The architecture also does not need to attach, for example, centerness prediction, or keypoint prediction to either classification branch or regression branch. Instead, by deploying the dynamic head architecture 300, a more flexible detector is provided that only appends various types of predictions to the end of the head in some examples.

Figure 6:
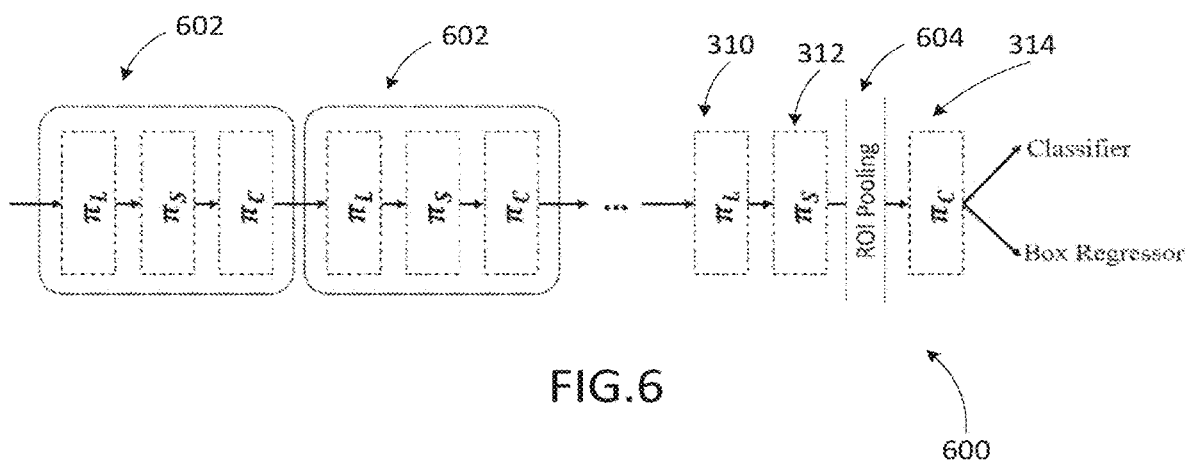
FIG. 6 is a block diagram illustrating a two-stage detector according to an example.

As another example, a two-stage detector 600 is illustrated in FIG. 6 with multiple heads 602 and in which bounding box proposals and ROI-pooling layers 604 extract intermediate representations from a feature pyramid of a backbone network (e.g., the feature pyramid 306 shown in FIG. 3). To provide this characteristic, the two-stage detector 600 is configured to first apply the scale-aware attention 310 and the spatial-aware attention 312 on the feature pyramid 306 before passing through the ROI-pooling layers 604. Then, the task-aware attention 314 is used to replace the fully connected layers.

One or more of the various examples can be modified or configured in different implementations. For example, in one implementation, deformable convolution is utilized as the transformation learning of convolutional layers by introducing sparse sampling, such as with the backbone 302 (shown in FIG. 3) to enhance the feature representations. For example, the deformable convolution can be utilized with the present disclosure in the unified head 304 (object detection head), wherein deformable convolution solely models S sub-dimensions in the illustrated configuration. In this example, deformable processing is used in the backbone 302 and is complementary to the dynamic head architecture 300.

In some examples, non-local networks are implemented that utilize attention processing to enhance the performance of object detection. In this example, the non-local networks use a simple formulation of dot-product to enhance a pixel feature by fusing other pixels' features from different spatial locations. This behavior can be regarded as modeling only L×S sub-dimensions in the dynamic head architecture 300.

In some examples, a transformer is imported from natural language processing into computer vision tasks. The transformer provides a simple solution to learn cross-attention correspondence and fuse features from different modalities by applying multi-head fully connected layers. This behavior can be viewed as modeling only S×C sub-dimensions in the dynamic head architecture 300.

Thus, using a rescaled and reshaped feature pyramid 306 with the scale-aware attention 310, the spatial-aware attention 312, and the task-aware attention 314, object detection is performed in various examples. Table 1 illustrates the results of an ablation study performed using the present disclosure.

TABLE 1

| L. | S. | C. | AP | $AP_{50}$ | $AP_{75}$ | $AP_S$ | $AP_M$ | $AP_L$ |
|---|---|---|---|---|---|---|---|---|
| X | X | X | 39.0 | 57.2 | 42.4 | 22.1 | 43.1 | 50.2 |
| ✓ | X | X | 39.9 | 57.8 | 43.5 | 25.4 | 44.0 | 52.4 |
| X | ✓ | X | 41.4 | 58.5 | 45.2 | 26.8 | 45.2 | 54.3 |
| X | X | ✓ | 40.3 | 58.3 | 43.9 | 24.2 | 44.6 | 53.7 |
| ✓ | ✓ | X | 41.9 | 59.2 | 45.6 | 24.8 | 46.1 | 54.5 |
| ✓ | ✓ | ✓ | 42.6 | 60.1 | 46.4 | 26.1 | 46.8 | 56.0 |

Specifically, Table 1 illustrates the results of a controlled study on the effectiveness of different components in the dynamic head architecture 300 by gradually adding the components to the baseline. Shown in Table 1, "L.", "S.", "C." represent the scale-aware attention 310, the spatial-aware attention 312, and the task-aware attention 314. As can be seen, individually adding each component to the baseline improves its performance by 0.9 mAP, 2.4 mAP and 1.3 mAP. It is expected to see the spatial-aware attention 312 achieving the largest gain because of the dominant dimensionality of the spatial-aware attention 312 among the three modules. Then both "L." and "S." are added to the baseline, resulting in a continuous improvement in the performance by 2.9 mAP. Finally, the full dynamic head block with the scale-aware attention 310, the spatial-aware attention 312, and the task-aware attention 314 significantly improves the baseline by 3.6 mAP. The results demonstrate that different components work as a coherent system or network.

Thus, with the various examples, an object detection head is provided with unified scale-awareness, spatial-awareness and task-awareness attentions in a single framework that uses a rescaled and reshaped feature pyramid (or tensor). It should be appreciated that as a plugin, the dynamic head is flexible and can be integrated to any kind of object detector framework to boost performance. Moreover, efficient learning results from implementing the various examples.

Figure 7:
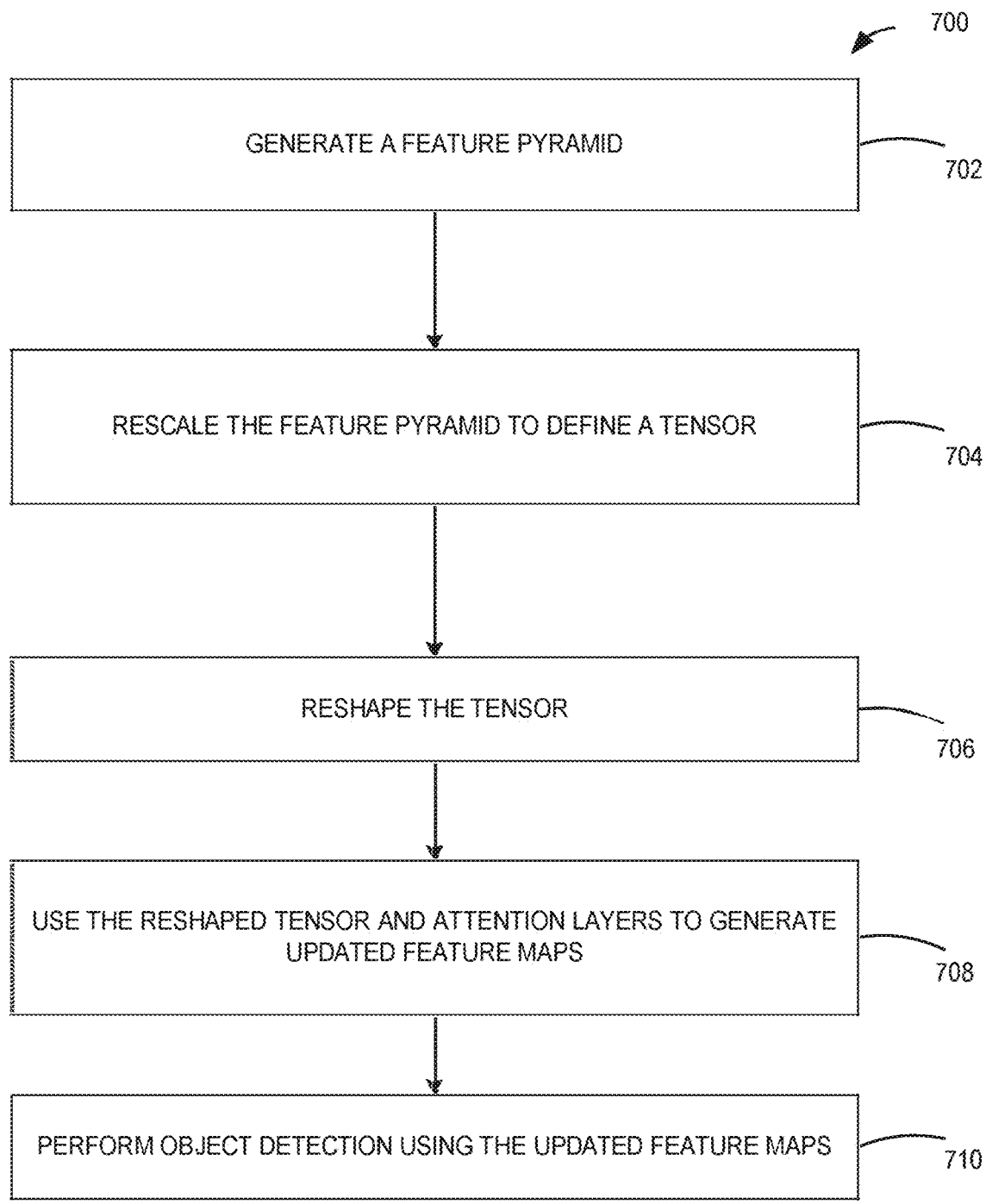
FIG. 7 is a flow chart illustrating operations of a computing device to perform object detection according to an example.

As should be appreciated, the various examples can be used in the operation of different types of neural networks and for different types of object detection. Additionally, the various examples can be used to perform object detection with different types of data. FIG. 7 illustrates a flow chart of a method 700 for performing object detection of various examples. The operations illustrated in the flow chart described herein can be performed in a different order than is shown, can include additional or fewer steps, and can be modified as desired or needed. Additionally, one or more operations can be performed simultaneously, concurrently, or sequentially. The method 700 is performed in some examples on computing devices, such as a server or computer having processing capabilities to efficiently perform the operations, such as a graphics processing unit (GPU).

With reference to the method 700, illustrating a method for object detection, a computing device generates a feature pyramid corresponding to image data at 702. That is, the feature pyramid is an image pyramid having extracted features from the image data (e.g., backbone features identified in feature maps). The computing device rescales the feature pyramid to a scale corresponding to a median level of the feature pyramid at 704. In one example, the rescaled feature pyramid is the 4D tensor as described herein.

The computing device reshapes the 4D tensor into a 3D tensor corresponding to scale features, spatial features, and task features corresponding to a general view comprising a plurality of feature maps at 706. That is, in some examples, the feature pyramid is converted to a general view in 3D, wherein each feature level is in three dimensions. In one example, the height and width dimensions are combined as a spatial feature into a geometric feature.

The computing device uses the reshaped tensor and attention layers to generate updated feature maps for the plurality of feature maps at 708. That is, the reshaped 3D tensor is used to generate updated feature maps using attention layers. In some examples as described herein, the attention layers are configured to apply a scale-aware attention, a spatial-aware attention, and a task-aware attention. In one example, the scale-aware attention is applied on a dimension of level of the 3D tensor, wherein the scale-aware attention is configured to dynamically fuse scale features from different scales. The spatial-aware attention is applied (e.g., deployed) on a dimension of space of the 3D tensor, wherein the spatial-aware attention is configured to aggregate spatial features across levels at the same spatial locations. The task-aware attention is applied within channels of the 3D tensor after applying the scale-aware attention and the spatial aware attention, wherein the task-aware attention is configured to generalize different representations of objects. The plurality of feature maps are thereby reformed into different activations based on different object detection tasks to be performed.

The computing device performs object detection on the image data using the updated plurality of feature maps at 710. For example, as described herein, object detection is performed using reformed feature maps with improved detection characteristics or properties.

Thus, in some examples, the method 700 can be used to perform object detection using a rescaled and reshaped tensor. The rescaled and reshaped tensor is used to generate an output using attention layers in some examples.

Exemplary Operating Environment

Figure 8:
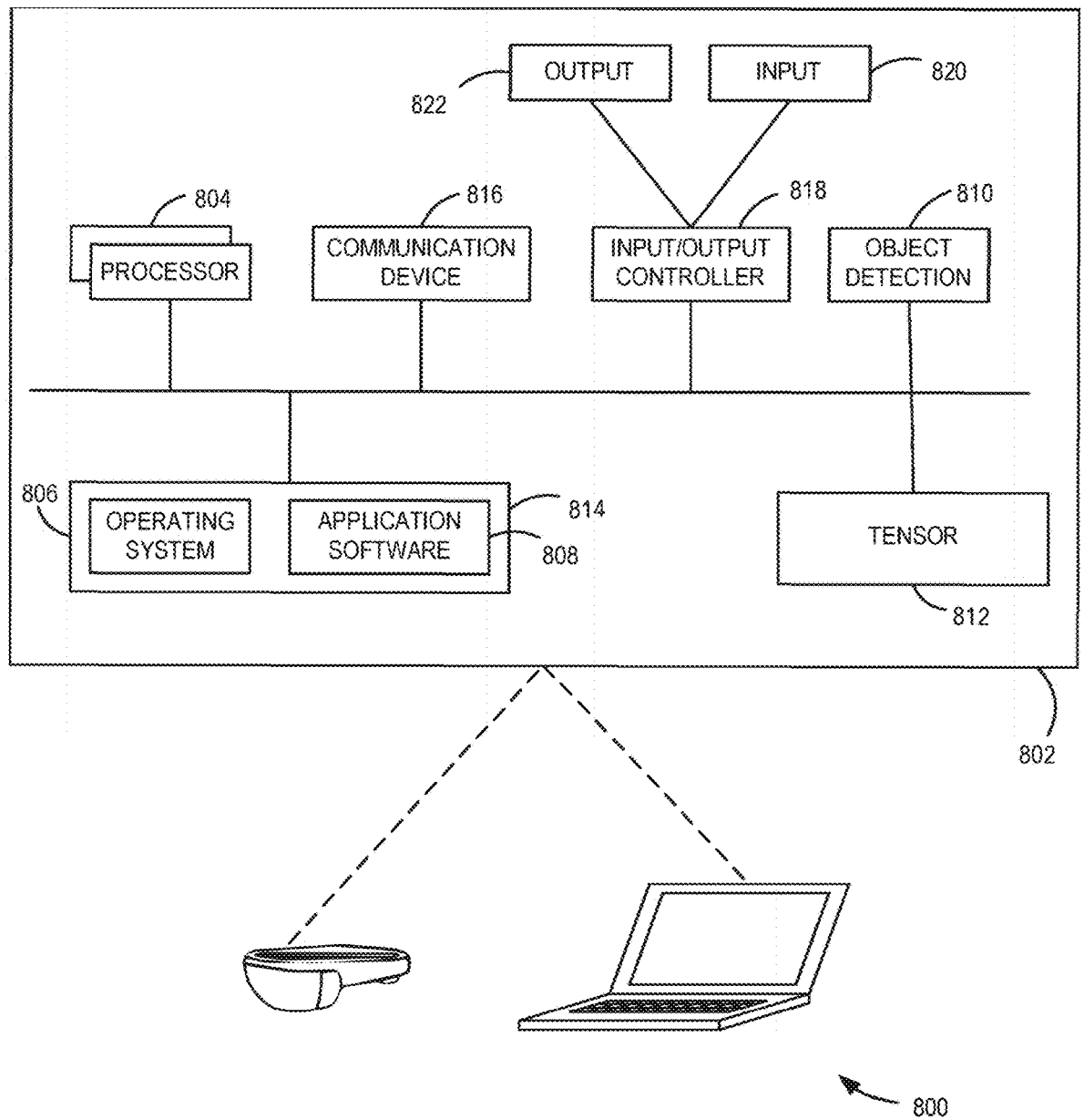
FIG. 8 illustrates a computing apparatus according to example as a functional block diagram.

The present disclosure is operable with a computing apparatus 802 according to an example as a functional block diagram 800 in FIG. 8. In one example, components of the computing apparatus 802 may be implemented as a part of an electronic device according to one or more embodiments described in this specification. The computing apparatus 802 comprises one or more processors 804 which may be microprocessors, controllers, or any other suitable type of processors for processing computer executable instructions to control the operation of the electronic device. Platform software comprising an operating system 806 or any other suitable platform software may be provided on the apparatus 802 to enable application software 808 to be executed on the device. According to an example, object detection 810 that operates using a rescaled and reshaped tensor 812 can be accomplished by software.

Computer executable instructions may be provided using any computer-readable media that are accessible by the computing apparatus 802. Computer-readable media may include, for example, computer storage media such as a memory 814 and communications media. Computer storage media, such as the memory 814, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 814) is shown within the computing apparatus 802, it will be appreciated by a person skilled in the art, that the storage may be distributed or located remotely and accessed via a network or other communication link (e.g. using a communication interface 816).

The computing apparatus 802 may comprise an input/output controller 818 configured to output information to one or more input devices 820 and output devices 822, for example a display or a speaker, which may be separate from or integral to the electronic device. The input/output controller 818 may also be configured to receive and process an input from the one or more input devices 820, for example, a keyboard, a microphone, or a touchpad. In one embodiment, the output device 822 may also act as the input device 820. An example of such a device may be a touch sensitive display. The input/output controller 818 may also output data to devices other than the output device 822, e.g. a locally connected printing device. In some embodiments, a user may provide input to the input device(s) 820 and/or receive output from the output device(s) 822.

In some examples, the computing apparatus 802 detects voice input, user gestures or other user actions and provides a natural user interface (NUI). This user input may be used to author electronic ink, view content, select ink controls, play videos with electronic ink overlays and for other purposes. The input/output controller 818 outputs data to devices other than a display device in some examples, e.g. a locally connected printing device.

The functionality described herein can be performed, at least in part, by one or more hardware logic components. According to an embodiment, the computing apparatus 802 is configured by the program code when executed by the processor(s) 804 to execute the examples and implementation of the operations and functionality described. Alternatively, or in addition, the functionality described herein can be performed, at least in part, by one or more hardware logic components. For example, and without limitation, illustrative types of hardware logic components that can be used include FPGAs, ASICs, ASSPs, SOCs, CPLDs, and GPUs.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Other examples include:

A computerized method for object detection, the computerized method comprising:

generating a feature pyramid corresponding to image data;
rescaling the feature pyramid to a scale corresponding to a median level of the feature pyramid, wherein the rescaled feature pyramid is a four-dimensional (4D) tensor;
reshaping the 4D tensor into a three-dimensional (3D) tensor corresponding to scale features, spatial features, and task features corresponding to a general view comprising a plurality of feature maps;
using the 3D tensor and a plurality of attention layers to update the plurality of feature maps; and
performing object detection on the image data using the updated plurality of feature maps.
Other examples include:
A system for object detection, the system comprising:
at least one processor; and
at least one memory comprising computer program code, the at least one memory and the computer program code configured to, with the at least one processor, cause the at least one processor to:
generate a feature pyramid corresponding to image data;
rescale the feature pyramid to a scale corresponding to a median level of the feature pyramid, wherein the rescaled feature pyramid is a four-dimensional (4D) tensor;
reshape the 4D tensor into a three-dimensional (3D) tensor having individual perspectives including scale features, spatial features, and task features corresponding to different dimensions of the 3D tensor;
use the 3D tensor and a plurality of attention layers to update a plurality of feature maps associated with the image data; and
perform object detection on the image data using the updated plurality of feature maps.
Other examples include:
One or more computer storage media having computer-executable instructions for object detection that, upon execution by a processor, cause the processor to at least:
receive a three-dimensional (3D) tensor from a backbone network, the 3D tensor generated from a feature pyramid;
use a dynamic head having a plurality of attention mechanisms in combination with the 3D tensor to perform a plurality of object detection task simultaneously on image data, the plurality of attention mechanisms comprising multiple modalities of attentions from different perspectives arranged sequentially; and
output the image data with detected objects resulting from performing the plurality of object detection tasks.
Alternatively, or in addition to the examples described above, examples include any combination of the following:
wherein the rescaling comprises resizing consecutive level features toward a scale of the median level of the feature using one of up-sampling or down-sampling to convert the feature pyramid to the general view.
wherein the reshaping comprises combining a height dimension and a width dimension of the 4D tensor as the spatial feature in the general view.
wherein the 4D tensor corresponding to the rescaled feature comprises a plurality of levels and is represented by dimensions corresponding to a height, a width, and channel numbers of the median level feature.
wherein a scale-aware attention, a spatial-aware attention, and a task-aware attention correspond to the height, the width, and the channel numbers of the median level feature, respectively.
wherein using the 3D tensor and a plurality of attention layers to update the plurality of feature maps comprises:
applying scale-aware attention processing on a dimension of level of the 3D tensor, the scale-aware attention processing configured to dynamically fuse scale features from different scales;
applying spatial-aware processing on a dimension of space of the 3D tensor, t he spatial-aware processing configured to aggregate spatial features across levels at same spatial locations; and
applying task-aware processing within channels of the 3D tensor after deploying the scale-aware attention processing and the spatial-aware attention processing, wherein the task-aware processing is configured to generalize different representations of objects, and wherein the plurality of feature maps are reformed into different activations based on different object detection tasks to be performed.
wherein performing object detection on the image data using the updated plurality of feature maps comprises at least one computer vision task.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The examples illustrated and described herein as well as examples not specifically described herein but within the scope of aspects of the claims constitute exemplary means for training a neural network. The illustrated one or more processors 804 together with the computer program code stored in memory 814 constitute exemplary processing means for fusing multimodal data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

The phrase "one or more of the following: A, B, and C" means "at least one of A and/or at least one of B and/or at least one of C." The phrase "and/or", as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one implementation, to A only (optionally including elements other than B); in another implementation, to B only (optionally including elements other than A); in yet another implementation, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for object detection, the computerized method comprising:
generating a feature pyramid corresponding to image data;
rescaling the feature pyramid to a scale corresponding to a median level of the feature pyramid, wherein the rescaled feature pyramid is a four-dimensional (4D) tensor;
reshaping the 4D tensor into a three-dimensional (3D) tensor having individual perspectives including scale features, spatial features, and task features corresponding to different dimensions of the 3D tensor, wherein the dimensions of the 3D tensor include a level dimension, a space dimension, and a channel dimension;
using the 3D tensor and a plurality of attention layers to update a plurality of feature maps associated with the image data, wherein the attention layers of include a scale-aware attention corresponds to the level dimension of the 3D tensor, a spatial-aware attention corresponds to the space dimension of the 3D tensor, and a task-aware attention correspond to the channel dimension of the 3D tensor;
performing object detection on the image data using the updated plurality of feature maps; and
sending an output signal based on the object detection performed on the image data.

2. The computerized method of claim 1, wherein the rescaling comprises resizing consecutive level features toward a scale of the median level of the feature pyramid using one of up-sampling or down-sampling to convert the feature pyramid to a general view.

3. The computerized method of claim 1, wherein the reshaping comprises combining a height dimension and a width dimension of the 4D tensor.

4. The computerized method of claim 1, wherein the 4D tensor corresponding to the rescaled feature comprises a plurality of levels and is represented by dimensions corresponding to a height, a width, and channel numbers of the median level of the feature pyramid.

5. The computerized method of claim 1, wherein using the 3D tensor and a plurality of attention layers to update the plurality of feature maps comprises:
applying scale-aware attention processing on a dimension of level of the 3D tensor, the scale-aware attention processing configured to dynamically fuse scale features from different scales;
applying spatial-aware processing on a dimension of space of the 3D tensor, the spatial-aware processing configured to aggregate spatial features across levels at same spatial locations; and
applying task-aware processing within channels of the 3D tensor after applying the scale-aware attention processing and the spatial-aware processing, wherein the task-aware processing is configured to generalize different representations of objects, and wherein the plurality of feature maps are reformed into different activations based on different object detection tasks to be performed.

6. The computerized method of claim 1, wherein performing object detection on the image data using the updated plurality of feature maps comprises at least one computer vision task.

7. A system for object detection, the system comprising:
at least one processor; and
at least one memory comprising computer program code, the at least one memory and the computer program code configured to, with the at least one processor, cause the at least one processor to:
generate a feature pyramid corresponding to image data;
rescale the feature pyramid to a scale corresponding to a median level of the feature pyramid, wherein the rescaled feature pyramid is a four-dimensional (4D) tensor;
reshape the 4D tensor into a three-dimensional (3D) tensor having individual perspectives including scale features, spatial features, and task features corresponding to different dimensions of the 3D tensor, wherein the dimensions of the 3D tensor include a level dimension, a space dimension, and a channel dimension;
use the 3D tensor and a plurality of attention layers to update a plurality of feature maps associated with the image data, wherein the attention layers of include a scale-aware attention corresponds to the level dimension of the 3D tensor, a spatial-aware attention corresponds to the space dimension of the 3D tensor, and a task-aware attention correspond to the channel dimension of the 3D tensor;
perform object detection on the image data using the updated plurality of feature maps; and
send an output signal based on the object detection performed on the image data.

8. The system of claim 7, wherein rescaling the feature pyramid comprises resizing consecutive level features toward a scale of a median level of the feature pyramid using one of up-sampling or down-sampling to convert the feature pyramid to a general view.

9. The system of claim 7, wherein reshaping the 4D tensor comprises combining a height dimension and a width dimension of the 4D tensor.

10. The system of claim 7, wherein the 4D tensor corresponding to the rescaled feature pyramid comprises a plurality of levels and is represented by dimension corresponding to a height, a width, and channel numbers of the median level of the feature pyramid.

11. The system of claim 7, wherein using the 3D tensor and a plurality of attention layers to update the plurality of feature maps comprises:
applying scale-aware attention processing on a dimension of level of the 3D tensor, the scale-aware attention processing configured to dynamically fuse scale features from different scales;
applying spatial-aware processing on a dimension of space of the 3D tensor, the spatial-aware processing configured to aggregate spatial features across levels at same spatial locations; and
applying task-aware processing within channels of the 3D tensor after applying the scale-aware attention processing and the spatial-aware processing, wherein the task-aware processing is configured to generalize different representations of objects, and wherein the plurality of feature maps are reformed into different activations based on different object detection tasks to be performed.

12. The system of claim 7, wherein performing object detection on the image data using the updated plurality of feature maps comprises performing at least one computer vision task.

13. The system of claim 7, wherein the 4D tensor includes dimensions corresponding to a height, a width, and a channel number of the median level of the feature pyramid.

14. The method of claim 1, wherein the 4D tensor includes dimensions corresponding to a height, a width, and a channel number of the median level of the feature pyramid.

15. A computerized method for object detection, the computerized method comprising:
generating a feature pyramid corresponding to image data;
rescaling the feature pyramid to a four-dimensional (4D) tensor based on a median level of the feature pyramid, the 4D tensor including a level dimension (L dimension) representing a number of levels in the feature pyramid, a height dimension (H dimension) representing a height of the median level of the feature pyramid, a width dimension (W dimension) representing a width of the median level of the feature pyramid, and a channel dimension (C dimension) representing the number of channels in the median level of the feature pyramid;
reshaping the 4D tensor into a three-dimensional (3D) tensor by setting a space dimension (S dimension) of the 3D tensor equal to a product of the W dimension of the 4D tensor and the H dimension of the 4D tensor, wherein the 3D tensor has the same L and C dimensions as the 4D tensor;
updating feature maps associated with the image data by applying a scale-aware attention exclusively to the L dimension of the 3D tensor, a spatial-aware attention exclusively to the S dimension of the 3D tensor, and a task-aware attention exclusively to the C dimension of the 3D tensor;
performing object detection on the image data using the updated feature maps; and
sending an output signal based on the object detection performed on the image data.

16. The computerized method of claim 15, wherein rescaling the feature pyramid to the 4D tensor comprises resizing consecutive level features toward a scale of the median level of the feature pyramid by up-sampling to convert the feature pyramid to a general view.

17. The computerized method of claim 15, wherein rescaling the feature pyramid to the 4D tensor comprises resizing consecutive level features toward a scale of the median level of the feature pyramid by down-sampling to convert the feature pyramid to a general view.

18. The computerized method of claim 15, wherein updating the feature maps comprises:
applying scale-aware attention processing on a dimension of level of the 3D tensor, the scale-aware attention processing configured to dynamically fuse scale features from different scales;
applying spatial-aware processing on a dimension of space of the 3D tensor, the spatial-aware processing configured to aggregate spatial features across levels at same spatial locations; and
applying task-aware processing within channels of the 3D tensor after applying the scale-aware attention processing and the spatial-aware processing, wherein the task-aware processing is configured to generalize different representations of objects, and wherein the feature maps are reformed into different activations based on different object detection tasks to be performed.

19. The computerized method of claim 15, wherein performing object detection on the image data using the updated feature maps comprises performing at least one computer vision task.

20. The computerized method of claim 15, wherein the output signal includes an image having objects detected.

* * * * *